| United States Patent [19] | [11] Patent Number: 4,734,325 |
| Ryoke et al. | [45] Date of Patent: * Mar. 29, 1988 |

[54] MAGNETIC RECORDING MEDIUM

[75] Inventors: Katsumi Ryoke; Nobutaka Yamaguchi; Masatoshi Takahashi; Kazuko Hanai; Hideaki Kosha; Eiichi Tadokoro, all of Kanagawa, Japan

[73] Assignee: Fuji Photo Film Co., Ltd., Kanagawa, Japan

[*] Notice: The portion of the term of this patent subsequent to Apr. 15, 2003 has been disclaimed.

[21] Appl. No.: 784,076

[22] Filed: Oct. 4, 1985

[30] Foreign Application Priority Data

Oct. 12, 1984 [JP] Japan ................. 59-212603

[51] Int. Cl.$^4$ ................................. G11B 5/70
[52] U.S. Cl. .................... 428/323; 427/131; 428/329; 428/694; 428/695; 428/900
[58] Field of Search ............... 428/694, 695, 900, 408, 428/402, 373, 329; 427/131; 360/134–136

[56] References Cited

U.S. PATENT DOCUMENTS

| 4,328,935 | 5/1982 | Steel | 428/900 |
| 4,414,270 | 11/1983 | Miyoshi et al. | 428/328 |
| 4,419,406 | 12/1983 | Isobe et al. | 428/694 |
| 4,451,531 | 5/1984 | Isobe et al. | 428/329 |
| 4,551,386 | 11/1985 | Yamaguchi et al. | 427/131 |
| 4,582,757 | 4/1986 | Miyoshi et al. | 427/131 |
| 4,592,952 | 6/1986 | Miyoshi et al. | 427/131 |

FOREIGN PATENT DOCUMENTS 3433326  3/1985  Fed. Rep. of Germany ...... 428/694

*Primary Examiner*—Paul J. Thibodeau
*Attorney, Agent, or Firm*—Sughrue, Mion, Zinn, Macpeak, and Seas

[57] ABSTRACT

A magnetic recording medium comprising a non-magnetic support having provided thereon a magnetic layer being provided on one surface of the support and a backing layer being provided on the surface of the support opposite to said magnetic layer, the backing layer contains binder and non-magnetic particles comprised of (i) corbon black having an average particle size of 0.1 to 1.0 μm and (ii) particles of abrasives having a Mohs' hardness of at least 6 and an average particle size of 1 μm or less, with the non-magnetic particles in said backing layer being used in an amount of 40 to 300 parts by weight per 100 parts by weight of binder.

6 Claims, No Drawings

MAGNETIC RECORDING MEDIUM

FIELD OF THE INVENTION

The present invention relates to a magnetic recording medium, and more particularly it relates to a magnetic recording medium comprising a support having a magnetic layer and a backing layer which is provided on the surface of the support opposite to the magnetic layer in order to reduce drop out and to improve video S/N.

BACKGROUND OF THE INVENTION

Recently, there have been requirements to make a more sensitive magnetic recording medium. If the magnetic recording medium is made more highly sensitive, a high image quality as well as a good sound quality and high density recording can be realized. These improvements can be attained by improving the recording system of a deck used for magnetic recording and reproducing system of a magnetic recording medium and also by improving the magnetic recording medium.

A magnetic recording medium can be highly sensitized by increasing the signal and decreasing the noise in the signal/noise ratio. The signal can be increased by increasing the residual magnetic flux density and coercive force of the magnetic recording media, which can be realized by making the ferromagnetic particles finer or adjusting the shape of anisotropy and the arrangement of the single magnetic domain of each ferromagnetic fine particles.

The noise can be decreased by various factors, for example, by smoothing a magnetic layer and controlling the electrification properties of magnetic recording media. Japanese Patent Publication (examined) No. 3927/75, Japanese Patent Application (OPI) Nos. 111828/82 and 96505/77 (the term "OPI" as used herein refers to "published unexamined Japanese patent application") and U.S. Pat. No. 4,135,031 disclose that a backing layer can be provided in order to control the electrification properties of a magnetic recording medium and to maintain running durability thereof.

However, it is impossible to obtain a satisfactory magnetic recording medium having high sensitivity and sufficient running durability by the above described technology. There are a number of reasons why it has not been possible to obtain such satisfactory magnetic recording medium: thus (1) although spacing loss between a magnetic recording and reproducing head, and a magnetic recording medium can be reduced by smoothing a surface of the magnetic recording medium, running durability deteriorates and friction coefficient increases, whereby the magnetic layer is peeled apart; (2) if a surface of a backing layer is made coarse to improve running durability thereof, the surface roughness of the backing layer is transferred to the magnetic layer. Thereby, the signal/noise ratio of the magnetic layer is decreased; (3) at an initial stage of running of a magnetic recording medium that the magnetic layer and the backing layer are not yet peeled apart, drop out (the term "drop out" herein means such level changes that recording skips instantaneously by dust and powders (hereinafter, referred to as a "scraped powders") which come off from a magnetic layer upon running) increases, thereby decreasing the signal/noise ratio; and (4) when a calender forming method is conducted to obtain a smooth surface of a magnetic layer and to obtain a highly sensitive magnetic recording, as disclosed, for example, in U.S. Pat. No. 3,916,039, the backing layer readily is peeled apart, and therefore, it is difficult to manufacture a magnetic recording medium having such a smooth surface on the magnetic layer.

SUMMARY OF THE INVENTION

As a result of various investigations, the inventors of the present invention have found that drop out occurring at an initial stage and after repeated run, is caused by dust and scraped powders which stays on the magnetic recording medium. In many cases, adhesion of dust is influenced by the arrangement and the insulating or non-insulating properties, of the running guide of magnetic tapes on a deck for magnetic recording and reproducing and the running speed of the magnetic tape. Particularly in a magnetic recording medium, adhesion of dust is influenced by the electrification properties and surface electric resistance thereof. Electrification properties include not only properties of surface electric resistance of the magnetic recording medium but also those of triboelectric potential of the medium. Therefore, particles and binder resin should carefully be selected in light of the above properties. They should also carefully be selected considering that a backing layer peels apart in calendering process. Further, the surroundings where a magnetic recording medium runs are important, because they have a close and complicated relation with the electrification properties of dust and the temperature and humidity have an effect on the electrification properties thereof. Considering the friction properties, the inventors of the present invention have found a satisfactory backing layer, which the signal/noise ratio of the magnetic layer does not decrease, although the surface roughness of the backing layer is transferred to the magnetic layer.

A first object of the present invention is to provide a magnetic recording medium having reduced drop out and a better signal/noise ratio by providing a novel backing layer.

A second object of the present invention is to provide a magnetic recording medium comprising a backing layer having good running properties.

A third object of the present invention is to provide a highly sensitive magnetic recording medium comprising a backing layer, having a surface roughness which does not affect the signal/noise ratio of the magnetic layer.

A fourth object of the present invention is to provide a magnetic recording medium comprising the backing layer which is not peeled apart when a pressure forming (i.e. a calendering process) is carried out.

The inventors of the present invention have made studies with the aim of removing the defects of the prior art and have found that the above objects of the invention can be accomplished by the following invention.

That is, the present invention relates to a magnetic recording medium comprising a non-magnetic support having provided thereon a magnetic layer being provided on one surface of the support and a backing layer being provided on the surface of the support opposite to the magnetic layer, the backing layer containing a binder and non-magnetic particles comprised of (i) carbon black having an average particle size of 0.1 to 1.0 $\mu$m and (ii) particles of abrasives having a Mohs' hardness of at least 6 and an average particles of 1.0 $\mu$m or less, with the non-magnetic particles in the backing layer being used in an amount of 40 to 300 parts by weight per 100 parts by weight of binder.

DETAILED DESCRIPTION OF THE INVENTION

The present invention is illustrated in more detail.

Finely ferromagnetic particles which can be used in the magnetic layer of the present invention include those ferromagnetic particles having a specific surface area (B.E.T. Method) measured by the nitrogen adsorption method of 25 m$^2$/g or more, preferably 30 m$^2$/g or more, such as $\gamma$-Fe$_2$O$_3$, Co-containing $\gamma$-Fe$_2$O$_3$, Fe$_3$O$_4$, Co-containing Fe$_3$O$_4$, CrO$_2$, Co-Ni-P alloy and Co-Ni-Fe alloy.

Specific examples are disclosed in Japanese Patent Publication Nos. 14090/69, 18372/70, 22062/72, 22513/72, 28466/71, 38755/71, 4286/72, 12422/72, 17284/72, 18509/72 and 18573/72.

Further, ferromagnetic particles, powders, additives, supports and a method for preparing a magnetic recording medium are disclosed in U.S. Pat. No. 4,135,016.

The dry thickness of the magnetic layer is preferably 0.5 to 15 $\mu$m.

The backing layer of the present invention contains non-magnetic particles, and especially contains non-magnetic carbon black particles having an average particles size of 0.1 to 1.0 $\mu$m.

As carbon black used in the backing layer of the present invention includes M.T. (Medium Thermal), F.T. (Fine Thermal) and furnace carbon corresponding to F.T., as classified in the carbon black industry. These carbon blacks are commercially available in the trade names of "Asahi Thermal" manufactured by Asahi Carbon Co., Ltd., "HTC#20" manufactured by Nittetsu Kagaku Co., Ltd., "Sevacarb M.T." manufactured by Sevalco Co., Ltd., "Huber N990" manufactured by Huber Co., Ltd., "Raven MTP" manufactured by Columbian Co., Ltd., and "Thermax P-33". The specific surface area measured by the nitrogen adsorption method of these carbon blacks is 25 m$^2$/g or less and these carbon blacks have scarcely a chain structure. Excessive dispersing power is required to blend carbon black and a binder, and generally it tends to break the structure of carbon black. However, if carbon black and binder are not sufficiently blended, the backing layer is easily peeled apart after coating. But, carbon black corresponding to M.T. and F.T. or furnace carbon corresponding to F.T. which has no chain structure or has scarcely chain structure is well blended with a binder and when the carbon is used, the surface electric resistance of a coated layer occurring while dispersing does not increase. These carbon blacks can make a surface of the backing layer properly coarse, and with the combination of the following resins, particles and binder ratio, particles of abrasives, and polyisocyanate, better durability can be obtained. The average particle size of these carbon black is preferably 0.1 to 1 $\mu$m, more preferably 0.15 to 0.5 $\mu$m.

The binder used in the backing layer of the present invention is comprised of resin and comprises conventionally used thermoplastic resins, thermosetting resins, reactive type resins and mixtures thereof.

The thermoplastic resins which can be used in the backing layer are resins having a softening temperature of 150° C. or less, an average molecular weight of 10,000 to 200,000, preferably 20,000 to 140,000 and a degree of polymerization of about 200 to 2,000, preferably 250 to 1,000 such as a copolymer of vinyl chloride and vinyl acetate, a polyurethane resin, a phenoxy resin, an epoxy resin, a polyester resin, a copolymer of acrylic acid ester and styrene, a copolymer of methacrylic acid ester and acrylonitrile, a copolymer of methacrylic acid ester and styrene, urethane elastomer, nylon and silicon type resin, a copolymer of butadiene and acrylonitrile, a polyamide resin, polyvinyl butyral, cellulose derivatives (cellulose acetate butylate, cellulose diacetate, cellulose triacetate, cellulose propionate), a copolymer of styrene and btadiene, a polyester resin, a copolymer of chlorovinyl ether and acrylic acid ester, an amino resin, various synthetic rubber type thermoplastic resins and the mixture thereof.

Preferred resins which can be used in the backing layer of the present invention are resins which have a 100% modulus, as defined in accordance with JIS-K 6301, of 150 kg/cm$^2$ or less, preferably 120 kg/cm$^2$ or less, among resins as described above, and are used in an amount of 50 wt % or more based on the total weight amount of binder, and particularly the resins having a 100% modulus of 120 kg/cm$^2$ or less are preferably used in an amount of 50 wt % or more based on the total weight amount of binder. If the binder contains a resin having a 100% modulus of more than 150 kg/cm$^2$, scratches are readily formed on the backing layer and drop out increases. Of those resins having 150 kg/cm$^2$ or less of a 100% modulus, typical commercially available resins which have 100% modulus of 150 kg/cm$^2$ or less are "DN-4805" (100% modulus=50 kg/cm$^2$), "DN-4806" (100 kg/cm$^2$), "DN-4830" (120 kg/cm$^2$), "N2302" (Nippollan N 2302) (25 to 40 kg/cm$^2$) and "N2304" (Nippollan N 2304) (15 to 30 kg/cm$^2$). All of them are a polyurethane manufactured by Nippon Polyurethane Co., Ltd. These resins used in the backing layer of the present invention are used in an amount of about 50 to 100 wt % preferably about 50 to 95 wt %, based on the total weight amount of binder.

The binder used in the backing layer of the present also is comprised of a polyisocyanate type hardening agent.

Polyisocyanate type hardening agents which can be used in the backing layer of the present invention are commercially available in the trade names of "Desmodule L" (Sumitomo Bayer Co., Ltd.), "Collonate L", (Nippon Polyurethane Co., Ltd.), "Takenate L", "Takenate D-200" (Takeda Chemical Industries, Ltd.) and "Desmodule TT" (Sumitomo Bayer Co., Ltd.).

Resins having a 100% modulus of 150 kg/cm$^2$ or less are used in an amount of about 50 to 100 wt % based on the total weight amount of binder, to reduce scratches on a tape made by dust between guide systems, because these resins are considered to absorb the shock of the dust. At the same time, a backing layer is required to be tough, and this property is imparted to the backing layer by the polyisocyanate having high-speed hardening performance. The polyisocyanate is used in an amount of preferably 5 to 40 wt %, more preferably 5 to 30 wt % based on the total weight amount of binder (i.e., resins having a 100% modulus of 150 kg/cm$^2$ or less, other resins and hardening agents).

Abrasives which can be used in the present invention are
(1) Chromium oxide Cr$_2$O$_3$ (Mohs' hardness of 8)
(2) Aluminum oxide Al$_2$O$_3$
(3) Iron oxide $\alpha$Fe$_2$O$_3$
(4) Mo$_2$C
(5) B$_4$C
(6) W$_2$C, WC
(7) Sic ($\alpha$-, $\beta$-)

(8) TiC.

These abrasives have a Mohs' hardness of 6 or more and an average particle size of 1.0 μm or less, preferably 0.05 to 0.7 μm. When abrasives having a large size, for example, 1.0 μm or more are incorporated in a backing layer, the guide of a tape running system of a videodeck is easily cut by the backing layer, which leads to a serious trouble. Therefore, the present invention has arrived at the combination of (1) abrasives which provide durability and are used in a small amount so that the guide is not damaged, (2) carbon black which provides better running stability and (3) a binder. A preferred amount of abrasives which can be used is 0.1 to 4 wt % based on the total weight amount of the non-magnetic particles (i.e., carbon black, abrasives, and other non-magnetic particles) in the backing layer.

The binder used in the backing layer of the present invention can contain resin other than the above described resin having a 100% modulus of 150 kg/cm$^2$ or less, and such other resin can be selected from these conventionally known thermoplastic resins, thermosetting resins, reactive type resins or mixtures thereof. The other resins are employed in an amount of 50 wt % or less based on the total weight amount of binder, and have a softening temperature of 150° C. or lower and an average molecular weight of 10,000 to 200,000, preferably 20,000 to 140,000 and a polymerization degree of about 200 to 2,000, preferably 250 to 1,000. Specific examples are a copolymer of vinyl chloride and vinyl acetate, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of acrylic acid ester and styrene, a copolymer of methacrylic acid ester and acrylonitile, a copolymer of methacrylic acid ester and vinylidene chloride, a copolymer of methacrylic acid ester and styrene, a urethane elastomer, nylon and silicon type resin, a nitrocellulose and polyamide resin, a polyvinyl fluoride, a copolymer of vinylidene chloride, and acrylonitrile, a copolymmer of butadiene and acrylonitrile, a polyamide resin, a polyvinyl butyral, cellulose derivatives (cellulose acetate butyrate, cellulose diacetate, cellulose triacetate, cellulose propionate and nitrocellulose), a copolymer of styrene and butadiene, a polyester resin, a copolymer of chlorovinyl ether and acrylic acid ester, an amino resin, various synthetic rubber type thermoplastic resins and the mixture thereof.

Specific examples thereof are disclosed in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/72.

In addition to the non-magnetic carbon black particles and abrasives, the backing layer of the present invention preferably contains other non-magnetic fine particles (hereinafter, referred to as a "other fine particles"). Examples of such other non-magnetic fine particles which can be used in the backing layer of the present invention include TiO, TiO$_2$, Talc, BaSO$_4$, CaCO$_3$, graphite, (CF)$_n$(BN)$_n$, ' SiO$_2$, MoS$_2$, ZnO, Al$_2$(SiO$_3$)$_2$, CaSiO$_3$, Zeolite, MgCO$_3$, BaCO$_3$, zirconium silicate, MgSiO$_n$, a benzoguanamine resin, CsO, BeO, (CB)$_n$, and Mg(OH)$_2$. Of these, particles whose surface electric resistance is low or particles whose surface electric resistance is high but can be reduced by surface treatment are preferred. These particles having an average particle size of about 0.01 μm to 3 μm are preferred.

The non-magnetic particles of the present invention comprises 50 wt % or more of the above described carbon, and further comprise abrasives and other fine particles. The amount of non-magnetic particles to total binder contained in the backing layer is 40 to 300 parts by weight of non-magnetic particles, and preferably 50 to 200 parts by weight of non-magnetic particles, per 100 parts by weight of binder. When the amount of non-magnetic particles exceeds 300 parts by weight of non-magnetic particles, adhesion of the non-magnetic support to the backing layer deteriorates and drop out readily increases after repeated run. When the amount of non-magnetic particles is under 40 parts by weight of non-magnetic particles, satisfactory surface electric resistance of a tape can hardly be kept and noise generated by discharge between the tape and deck head is detected as drop out.

In the present invention, various dispersing agents and lubricants can further be contained.

Dispersing agents which can be used in the backing layer of the present invention include a fatty acid having 12 to 18 carbon atoms (R$_1$COOH, wherein R$_1$ is an alkyl group having 11 to 17 carbon atoms) such as caprylic acid, capric acid, lauric acid, myristic acid, palmitic acid, stearic acid, oleic acid, elaidic acid, linoleic acid, linolenic acid or stearol acid; metal soaps comprise an alkali metal (Li, Na, K) of the fatty acid, and an alkali earth metal (Mg, Ca, Ba), Pb or Cu of the fatty acid; and lecithin.

Lubricating agents which can be used in the backing layer of the present invention include graphite, molybdenum disulfide, tungsten disulfide, fatty acid esters comprise monobasic fatty acid having 12 to 16 carbon atoms and monovalent alcohol having 3 to 12 carbon atoms, fatty acid esters comprise monobasic fatty acid having 17 or more of carbon atoms and monovalent alcohol having 21 to 23 carbon atoms including the number of carbon atoms in the fatty acid, and silicon compounds such as dimethylpolysiloxane or methyl phenyl siloxane.

Classification between dispersing agents and lubricating agents is not clear and there are many compounds which have both of the above described functions.

Solvents which can be used for mixing, kneading and coating the composition for the backing layer in the present invention include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate, glycol acetate or monoethyl ether; glycol ethers such as ether, glycol dimethyl ether, glycol monoethyl ether or dioxane; tars (aromatic hydrocarbons) such as benzene, toluene or xylene; chlorinated hydrocarbons such as methylene chloride, ethylene chloride, carbon tetrachloride, chloroform, ethylene chlorohydrin or dichlorobenzene and water, in an optional mixing ratio.

For preparing a magnetic recording layer or a backing layer, the components of the respective layer can optionally be combined, or dispersed in an organic solvent to prepare a coating composition which can then be coated on a support.

When a magnetic recording medium is used as a tape, the thickness of the support is about 2.5 to 100 μm, preferably 3 to 40 μm. Materials for the support include polyesters such as polyethylene terephthalate or polyethylene naphthalate, polyolefines such as polypropylene, cellulose derivatives such as cellulose triacetate or cellulose diacetate, vinyl type resins such as polyvinyl chloride, plastics such as polycarbonate, ceramics, glass, and metals such as aluminum or copper.

The components of the coating dispersion (carbon black, binders, solvents and particles) used for preparing the backing layer of the present invention can be dispersed by a ball mill, a pebble mill, a sand grinder, an atomizer, a three roll mill, a high speed impeller dispersing device, or a high speed stone mill.

A suitable method for coating the backing layer on a support includes an air doctor coating method, a blade coating method, an air knife coating method, a squeeze coating method, a dip coating method, a reverse roll coating method, a transfer roll coating method, a gravure coating method, a kiss coating method, a cast coating method, a spray coating method, and a bar coating method. Other coating methods can be used. These coating methods are disclosed in more detail in "Coating Engineering", pages 253 to 277, published by Asakura Shoten on Mar. 20, 1971.

The dry thickness of the backing layer is preferably 1.5 μm to 2.5 μm.

The present invention is further illustrated in more detail by the following Examples. It will be understood by those skilled in this art that materials, quantities and operation orders can be changed so long as the gist of the present invention is not essentially changed. Accordingly the present invention should not be limited to the following Examples. In the Examples, all parts are by weight.

EXAMPLE 1

The following composition was introduced into a ball mill, mixed and kneaded sufficiently and 40 parts of "Desmodule L-75" of TDI (tolylenediisocyanate) type hardening agents (a trade name of a polyisocyanate compound, manufactured by Bayer Co., Ltd.), were added thereto and were mixed and dispersed homogeneously to prepare a magnetic coating composition.

| | |
|---|---|
| Co-containing γ-$Fe_2O_3$ | 300 parts |
| (Specific surface area measured by the nitrogen absorption method: 30 $m^2/g$, Coecive force of powder: Hc = 600 Oe) | |
| Vinyl chloride/vinyl acetate compound(86/13) ("VMCH", a trade name, manufactured by Union Carbide, Co., Ltd.) | 30 parts |
| "Nippollan N2304" (Nippon Polyurethane) | 15 parts |
| Carbon black (Average particle size: 0.017 μm) | 20 parts |
| Lecithin | 3 parts |
| Oleic acid | 5 parts |
| Octyl laurate | 3 parts |
| Lauric acid | 3 parts |
| Butyl acetate | 330 parts |
| Methyl ethyl ketone | 660 parts |

The magnetic coating composition was coated on a polyethylene terephthalate support (thickness: 20 μm) and dried to form a magnetic layer (dry thickness: 5 μm).

The following composition for a backing layer was mixed and kneaded in a ball mill, and 30 parts of "Collonate L" (a trade name of a polyisocyanate, manufactured by Nippon Polyurethane Co., Ltd.) were added thereto and were mixed and dispersed homogeneously to form a backing layer coating composition. The backing layer coating composition was coated on the surface of the polyester support opposite to the magnetic layer in a thickness of 2 μm.

| | |
|---|---|
| Carbon black ("Raven MTP", Average particle size: 0.25 μm) | 200 parts |
| $Cr_2O_3$ (Average particle size: 0.7 μm) | 1 part |
| "Nippollan-2304" (manufactured by Nippon Polyurethane Co., Ltd.) | 80 parts |
| Saran resin (Dow-Chemical Co., Ltd.) | 30 parts |
| Myristic acid | 0.1 parts |
| Methyl ethyl ketone | 450 parts |
| Cyclohexanone | 50 parts |

The resulting tape was subjected to a calendering treatment to make its surface mirror-like and was slit to a 1 inch width to prepare a Sample No. 1.

EXAMPLE 2

The same procedure as in Example 1 was repeated to prepare a Sample No. 2 except that the thickness of the backing layer was 1.5 μm.

EXAMPLE 3

The same procedure as in Example 1 was repeated to prepare a Sample No. 3 except that the thickness of the backing layer was 2.5 μm.

EXAMPLE 4

"Raven MTP" was dispersed by cyclohexanone and underwent centrifuge of 3500 rpm for 5 times to prepare carbon black having an average particle size of 0.4 μm.

The same procedure as in Example 1 was respected to prepare a Sample No. 4 except that 200 parts of the above described carbon black was used in the backing layer coating composition instead of the carbon black employed in the backing layer of Example 1.

COMPARATIVE EXAMPLE 1

The same procedure as in Example 1 was repeated to prepare a Sample No. 5 except that 1 part of bentonite ($Al_2O_3$, $SiO_2$, Mohs' hardness: 1 to 2) was used in the backing layer coating composition instead of $Cr_2O_3$ (as abrasives) employed in the backing layer of Example 1.

COMPARATIVE EXAMPLE 2

The same procedure as in Example 1 was repeated to prepare a Sample No. 6 except that 1 part of titanium dioxide (anatase) (Mohs' hardness: 5.5 to 6) was used in the backing layer coating composition instead of $Cr_2O_3$. (as abrasives) employed in the backing layer of Example 1.

COMPARATIVE EXAMPLE 3

The same procedure as in Example 1 was repeated to prepare a Sample No. 7 except that the thickness of the backing layer was 3.0 μm.

COMPARATIVE EXAMPLE 4

The same procedure as in Example 1 was repeated to prepare a Sample No. 8 except that in the coating composition for the backing layer, 1 part of $Cr_2O_3$ having an average particle size of 1.3 μm was used instead of 1 part of $Cr_2O_3$ having an average particle size of 0.7 μm employed in the backing layer of Example 1.

COMPARATIVE EXAMPLE 5

The same procedure as in Example 1 was repeated to prepare a Sample No. 9 except that in the coating composition for the backing layer. $Cr_2O_3$ employed in the backing layer of Example 1 was removed.

Regarding these sample tapes, wear of a guide by the tape, scratches on the backing layer and the number of drop out (DO) of a tape of 5 minutes length after repeated run for 500 passes were measured and the results are shown in Table 1.

Wear of a guide by a tape was measured by repeating tape run at FF/REW mode for 10 passes, while setting a stainless blade along the tape path. Guide wear is shown by an average value of guide wear both at a right and a left guide.

Scratches formed on the backing layer were observed after sample tapes of 5 minutes length were repeated "play-rewind" on a deck for 1000 passes. The scratches were evaluated by the following ovaluation of three grades.

A: No scratches were observed.
B: 0 to 5 scratches were observed.
C: 6 or more scratches were observed.

The number of drop out was measured after sample tapes was repeated run for 500 passes. The number of drop out is shown by the number of occurrences of drop out for 5 μ sec or more measured by a drop out counter per 5 minutes where the reproduced output level decreased by 16 dB or more.

Output fluctuation of audio was measured by the maximum output fluctuation value (dB) of the reproduced output level which the signal of sin wave of 10 KHz was recorded by a prescribed bias at the level which is lower than 10 dB as the prescribed input level. The results are shown in Table 1.

TABLE 1

| | Abrasives | Thickness (μm) | Wear of Guide (μm) | Scratches on backing layer | Number of drop out | Output fluctuation of audio (dB) |
|---|---|---|---|---|---|---|
| 1 (Invention) | $Cr_2O_3$ (0.7 μm) | 2 | 4.0 | A | 67 | 0 |
| 2 (Invention) | " | 1.5 | 3.8 | A | 75 | 0 |
| 3 (Invention) | " | 2.5 | 4.1 | A | 70 | 0 |
| 4 (Invention) | " | 2.0 | 4.3 | A | 28 | 0 |
| 5 (Comparison) | Bentonite | 2.0 | 3.0 | B | 150 | 0 |
| 6 (Comparison) | Titanium dioxide | 2.0 | 3.2 | B | 144 | 0 |
| 7 (Comparison) | $Cr_2O_3$ (0.7 μm) | 3.0 | 5.3 | A | 43 | −4 |
| 8 (Comparison) | $Cr_2O_3$ (1.3 μm) | 2.0 | 21.4 | A | 62 | 0 |
| 9 (Comparison) | None | 2.0 | 3.9 | C | 151 | 0 |

EXAMPLE 5

The following composition was introduced into a ball mill, mixed and kneaded sufficiently, and 20 parts of "Desmodule L-75" of TDE (tolylenediisocyanate) type hardening agents (a trade name of a polyisocyanate compound manufactured by Bayer Co., Ltd.) were added thereto, and were mixed and dispersed homogeneously to prepare a magnetic coating composition.

| | |
|---|---|
| Co-containing γ-$Fe_2O_3$ (Spceific surface area measured by nitrogen absorption method: 35 m²/g, Coecive force of powder: HC = 800 Oe) | 300 parts |
| Copolymer of vinyl chloride/vinyl acetate/vinyl alcohol (87/5/8) (Degree of polymerization: about 400) | 30 parts |
| Epoxy resin (Epoxy group content: 0.56) | 10 parts |
| Carbon black (Average particle size: 0.09 μm) | 5 parts |
| Lecithin | 3 parts |
| Oleic acid | 1 part |
| Octyl laurate | 3 parts |
| Lauric acid | 4.5 parts |

| -continued | |
|---|---|
| Butyl acetate | 330 parts |
| Methyl isobutyl ketone | 660 parts |

The resulting magnetic coating composition was coated on a polyester support film (thickness: 18 μm) to form a magnetic layer (dry thickness: 6 μm).

A coating composition for a backing layer having the following formulation was prepared in a ball mill and was coated on the surface of the polyester support opposite to the magnetic layer in a 2 μm thickness.

| | |
|---|---|
| Carbon black ("Raven MTP", average particle size: 0.25 μm) | 110 parts |
| Talc (bentonite) | 50 parts |
| Graphite | 50 parts |
| "Nippollan-2304" (manufactured by Nippon Polyurethane Co., Ltd.) | 50 parts |
| Phenoxy resin (manufactured by UCC Co. Ltd.) | 25 parts |
| Chromium oxide (average particle size: 0.7 μm) | amounts shown in Table 2 |
| "Collonate 2014" | 25 parts |
| Methyl ethyl ketone | 450 parts |
| Cyclohexanone | 50 parts |

The resulting magnetic tape was subjected to calendering treatment to make its surface mirror-like and was slit to ¾ inch width to prepare Sample Nos. 10 to 15. The results are shown in Table 2.

TABLE 2

| | Amounts of chromium oxide (parts) | Guide wear (μm) | Scratches on backing layer | Number of drop out |
|---|---|---|---|---|
| 10 (Comparison) | 0 | 3 | C | 251 |
| 11 (Comparison) | 0.1 | 3 | B | 147 |
| 12 (Invention) | 0.3 | 3.2 | A | 42 |
| 13 (Invention) | 3 | 3.4 | A | 45 |
| 14 (Invention) | 8 | 4.5 | A | 41 |
| 15 (Comparison) | 15 | 5.8 | A | 1000 |

An abrasive is effective when it is used in an amount of 0.1 wt % to 4 wt % based on the total weight amount of the non-magnetic particles in the backing layer. When an excessive amount of the abrasive is used, the backing layer wears off the guide and upon rewinding of the tape, the scraped powders adheres on the magnetic tape, thereby generating drop out. It is unfavorable to use the abrasive in an amount of 5 wt % or more based on the total weight amount of the non-magnetic particles.

It is clear from the above results that the backing layer of the present invention exhibits extremely reduced guide wear, scratches on the backing layer and number of drop out, and has excellent characteristics.

In accordance with the present invention, a magnetic recording medium having reduced drop out, better signal/noise ratio, high sensitivity and a backing layer with good running properties which does not peel apart can be obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer on one surface of the support and a backing layer on the surface of the support opposite to said magnetic layer, the backing layer containing a binder consisting essentially of a resin having a 100% modulus of 150 kg/cm$^2$ or less which is selected from the group consisting of thermoplastic resins, thermosetting resins and mixtures thereof and non-magnetic particles comprised of (i) carbon black having an average particle size of 0.15 to 0.5 $\mu$m, and (ii) particles of abrasive having a Mohs' hardness of 8 or more and an average particle size of 1 $\mu$m or less wherein the particles of abrasive are contained in the backing layer in an amount of 0.1 to 4 wt % based on the total weight amount of non-magnetic particles in the backing layer, with the non-magnetic particles in said backing layer being used in an amount of 40 to 300 parts by weight per 100 parts by weight of binder, wherein a polyisocyanate hardening agent is present in an amount of 5 to 40% based on the total weight amount of binder and wherein the dry thickness of the backing layer is from 1.5 to 2.5 $\mu$m and wherein the particles of abrasive are contained in the backing layer in an amount of from 0.3 to 8 parts by weight based on 100 parts by weight of the total binder.

2. A magnetic recording medium as claimed in claim 1, wherein the carbon black comprises at least 50 wt % based on the total weight amount of the non-magnetic particles.

3. A magnetic recording medium as claimed in claim 1, wherein the average particle size of particles of abrasives is 0.05 to 0.7 $\mu$m.

4. A magnetic recording medium as claimed in claim 1, wherein the resin is present in amount of at least 50 wt % based on the total weight amount of binder.

5. A magnetic recording medium as claimed in claim 1, wherein said carbon black substantially does not have any chain structure.

6. A magnetic recording medium as claimed in claim 1, wherein the amount of abrasive particles in the backing layer is from 0.04 to 12 parts by weight per 100 parts by weight of binder.

* * * * *